United States Patent
Sarem et al.

[15] 3,704,990
[45] Dec. 5, 1972

[54] PROCESS FOR RECOVERING OIL FROM HETEROGENEOUS RESERVOIRS

[72] Inventors: Amir M. Sarem, Yorba Linda; Leroy W. Holm, Fullerton, both of Calif.

[73] Assignee: Union Oil Company of California, Los Angeles, Calif.

[22] Filed: June 4, 1971

[21] Appl. No.: 150,239

Related U.S. Application Data

[63] Continuation-in-part of Ser. No. 853,483, Aug. 27, 1969, abandoned.

[52] U.S. Cl. .................................................. 166/273
[51] Int. Cl. ............................................. E21b 43/22
[58] Field of Search ............................. 166/273–275

[56] References Cited

UNITED STATES PATENTS

| | | | |
|---|---|---|---|
| 3,039,529 | 6/1962 | McKennon | 166/275 |
| 3,044,544 | 11/1966 | Holbrook et al. | 166/273 |
| 3,282,337 | 11/1966 | Pye | 166/275 |
| 3,446,282 | 5/1969 | Cooke | 166/274 |
| 3,476,186 | 11/1969 | Sarem | 166/274 |
| 3,482,631 | 12/1969 | Jones | 166/273 |
| 3,482,632 | 12/1969 | Holm | 166/273 |
| 3,500,921 | 3/1970 | Abrams et al. | 166/273 |
| 3,500,922 | 3/1970 | O'Brien et al. | 166/273 |
| 3,580,337 | 5/1971 | Gogarty et al. | 166/273 |

*Primary Examiner*—Stephen J. Novosad
*Attorney*—Milton W. Lee, Richard C. Hartman, Lannas S. Henderson, Robert E. Strauss and Dean Sandford

[57] ABSTRACT

A process for recovering oil from heterogeneous petroleum reservoirs in which there is successively injected into the reservoir through one or more injection wells (1) an aqueous solution of a water-soluble polymer dissolved in substantially salt-free water, (2) a solvent miscible with the reservoir oil, and (3) an aqueous drive fluid; and wherein oil is recovered from one or more production wells spaced apart in the reservoir from the injection well. The polymer is selected to obtain mobility reduction in the more permeable zones without causing plugging of these zones.

15 Claims, No Drawings

PROCESS FOR RECOVERING OIL FROM HETEROGENEOUS RESERVOIRS

This is a continuation-in-part of Ser. No. 853,483 filed Aug. 27, 1969, now abandoned.

This invention relates to the recovery of oil from subterranean petroleum reservoirs, and more particularly to an improved miscible flooding process for the recovery of oil from heterogeneous oil-bearing reservoirs.

It has long been recognized that substantial amounts of oil remain unrecovered at the completion of normal primary recovery operations. Hence various secondary and tertiary methods of recovering additional quantities of oil have been proposed, such as the well-known technique of water flooding in which water is injected into the reservoir through an injection well to drive additional oil toward one or more production wells spaced apart in the reservoir from the injection well. Although an additional quantity of oil can often be recovered by water flooding, the efficiency of the water flood and the ultimate oil recovery can be further improved by introducing a solvent that is miscible with the connate oil, or with both the connate oil and the flood water, into the reservoir ahead of the flood water.

Solvents that have been proposed for injection into the reservoir ahead of a water drive include alcohols, such as isopropyl alcohol; LPG and light hydrocarbons; liquefield carbon dioxide and sulfur dioxide; soluble oils; and microemulsions formed by the addition of water to a soluble oil. Also, additional oil recovery can be effected by treating a reservoir with an aqueous surfactant solution that reduces the interfacial tension between the reservoir oil and water, thus providing a recovery technique somewhat similar to the true miscible displacement processes. Because of costs involved, it is usually preferred that only a relatively small amount of the solvent or miscible agent be injected, followed by the injection of a substantially larger quantity of aqueous flooding medium to drive the solvent through the reservoir toward the production wells. The miscible solvent-water drive flooding process can be employed in either secondary or tertiary oil recovery operations.

Heterogeneity in the reservoir structure often results in an injected fluid not being uniformly distributed throughout that portion of the reservoir being treated. While, in water flooding, it is desirable that high volumetric sweep efficiencies be achieved to prevent the flood water bypassing areas of the reservoir and leaving unrecovered oil in these bypassed areas; because of the large volume of flood water injected in the typical water flood, the success of the operation is not completely jeopardized by reservoir heterogeneity, unless highly permeable streaks are encountered that cause channelling of the flood water from the injection wells directly to the producing wells. Also, even where permeable channels are encountered, channelling of the flood water can be controlled by treating the more permeable zones with oil-soluble, water-insoluble diverting agents.

However, in the miscible flooding processes wherein the reservoir is treated with a small amount of a solvent that is driven through the reservoir by a subsequently injected aqueous displacement fluid, uniform contacting of the reservoir with the solvent is essential, and minor reservoir heterogeneity can cause a major reduction in oil recovery. Because of the relatively small amount of solvent usually employed in these processes, and because the solvent is disposed at the front of the drive bank, it is essential that this initial portion of the bank be uniformly brought into contact with as much of the oil-bearing portion of the reservoir as possible, and precluded from entering water-bearing strata and other zones containing little oil. Uniform distribution of the miscible fluid at the initial oil-miscible fluid interface is especially critical in watered-out reservoirs containing only residual oil, since oil will be recovered from only that portion of the reservoir contacted by the miscible fluid, as the subsequently injected flood water alone will effect no further recovery of oil.

Accordingly, a principal object of this invention is to provide an improved miscible flooding process for the recovery of petroleum from heterogeneous subterranean reservoirs. Another object of the invention is to provide a miscible flooding process in which a heterogeneous reservoir is substantially uniformly contacted with a solvent miscible with the reservoir oil. A further object of this invention is to provide a method of increasing the volumetric sweep efficiency of a small amount of an oil and water-miscible solvent injected ahead of an aqueous drive fluid. A still further object is to effect the substantially uniform distribution of a small volume of soluble oil or microemulsion injected into a heterogeneous reservoir ahead of a water drive. Other objects and advantages of the invention will be apparent from the following description.

Briefly, this invention contemplates a process for recovering oil from heterogeneous subterranean reservoirs in which an aqueous solution of a water-soluble polymer dissolved in substantially salt-free water and a small volume of a miscible dis-placement fluid are successively injected into the reservoir through an injection well, and thereafter an aqueous flooding medium is injected to drive the miscible displacement fluid towards a production well spaced apart in the reservoir from the injection well. The novel feature of this process is the use of a mobility controlling amount of an aqueous solution of a water-soluble polymer dissolved in low salt-content water to improve the volumetric sweep efficiency of the subsequently injected miscible displacement fluid, and in the technique of selecting the polymer to obtain maximum volumetric sweep efficiency.

More specifically, this invention involves a miscible flooding process for use in heterogeneous reservoirs in which an aqueous solution of a water-soluble polymer is injected into the reservoir ahead of a miscible flooding agent. In the practice of the invention, a slug of aqueous polymer solution is injected into the reservoir through one or more injection or input wells penetrating the oil-bearing formation. The type of polymer employed and its concentration in the aqueous solution are selected to provide reduced mobility in the more permeable strata, without effecting a substantially complete plugging of these strata. Following the slug of polymer solution, there is injected into the reservoir through the injection well a relatively small slug of miscible flooding agent, which is forced through the reservoir toward at least one production or output well by subsequently injected flood water. As the bank of miscible flooding agent passes through the reservoir, it displaces oil therein and moves it to the producing well, whereupon the oil can be recovered by conventional means. The injection and production wells can be arranged in any convenient pattern designed to achieve maximum contact of the oil-bearing zones by the advancing flood front, such as the conventional "five-spot" pattern wherein a central well is surrounded by four somewhat symmetrically located injection wells. Another of the conventional flooding patterns that can be employed in the practice of this invention is the "line drive" pattern in which the injection wells are arranged in a line so that the injected flooding medium advances through the formation to displace oil toward one or more spaced production wells that can also be arranged in a line substantially parallel to the line of injection wells.

While the miscible flooding process of this invention is particularly adapted for the recovery of oil from heterogeneous reservoirs; as a practical matter, most petroleum reservoirs exhibit some heterogeneity, and thus oil recoveries are improved in most naturally-occurring petroleum reservoirs by treatment with the process of this invention. By heterogeneity, it is meant that the reservoir is comprised of stratified layers of varying permeability, or that it contains fractures, cracks, fissures, streaks, vuggs, or zones of varying permeability that cause injected fluids to advance through the reservoir nonuniformly. Thus, the formations that are particularly amenable to treatment by the process of this invention are those formations that have strata or zones of different permeabilities, or which otherwise are structurally faulted so that the injected miscible displacement fluid does not advance through the formation at a substantially uniform rate along the entire flood front. Volumetric sweep efficiency is improved and oil recoveries increased as the miscible flood front is rendered more uniform. The term "volumetric sweep efficiency" as used herein is defined as the product of the horizontal and vertical sweep efficiencies.

The aqueous polymer solution injected ahead of the miscible solvent is a water solution of a water-soluble polymer especially selected for its ability to reduce fluid mobility in the more permeable zones without causing substantially complete plugging or stoppage of flow within these zones. Hence, the polymer must not exhibit any substantial chemical reaction with the reservoir rock, the connate reservoir fluids, the miscible displacement fluid, or with the aqueous solvent in which it is dissolved, that would cause cross-linking or precipitation of the polymer, or that would result in any substantial amount of adsorption of the polymer by the reservoir rock causing complete plugging of any particular strata or zone. The type of polymer employed for mobility adjustment ahead of the miscible solvent, its concentration in the aqueous polymer solution, and the amount of polymer solution injected into the reservoir are selected upon consideration of the permeability of the reservoir to the injected fluids, the differences in permeability between the various zones, and the reservoir volume to be treated. The reservoir structure can be predicted from core analyses, well logs, and the history of previous fluid injection programs, and the optimum mobility control can be verified by conventional laboratory core tests. Typically, mobility control can be achieved in most reservoirs by the injection of between about 0.005 and 0.15 pore volume of an aqueous polymer solution containing between about 0.01 and 0.20 weight percent polymer, and preferably between about 0.01 and 0.15 weight percent polymer, and even more preferably between about 0.02 to 0.06 weight percent of the polymer.

It has been found that certain polymers are particularly effective in achieving mobility control in the reservoir ahead of the miscible solvent. These polymers are soluble in water in the concentration ranges employed, exhibit little or no chemical reaction resulting in cross-linking or precipitation of the polymer in the presence of the reservoir rock, the connate reservoir fluids, the water in which it is dissolved, or with the miscible flooding agent or other injected fluid. Polymers exhibiting the desired properties are relatively high molecular weight acrylic acid-acrylamide copolymers, acrylic acid-acrylamide-diacetone acrylamide terpolymers, partially hydrolyzed polyacrylamides, hydroxyethyl cellulose, carboxymethyl cellulose, polyacrylamides, polyoxyethylenes, and polysaccharides.

Polymers that are particularly preferred to obtain mobility control in a heterogeneous reservoir ahead of a miscible solvent are relatively high molecular weight, water-soluble acrylamide-acrylic acid copolymers, partially hydrolyzed polyacrylamides and acrylic acid-acrylamide-diacetone acrylamide terpolymers characterized by resistance factors of between about 6 and 25, and preferably between about 10 and 20, for a 0.05 weight percent solution of the polymer in a 3 percent by weight solution of sodium chloride at 25° C. Resistance factor is a measure of the reluctance of a fluid to flow through a porous media, and is defined as the ratio of the mobility of a brine solution to the mobility of a polymer solution in a permeable body having residual oil saturation. This relationship can be expressed as:

$$R = \frac{\lambda_w}{\lambda_p} = \frac{\left(\frac{k_w}{\mu_w}\right)}{\left(\frac{k_p}{\mu_p}\right)}$$

wherein
 R = resistance factor
 $\lambda_w$ = mobility of brine
 $\lambda_p$ = mobility of polymer solution
 $k_w$ = permeability to brine, darcies
 $k_p$ = permeability to polymer solution, darcies
 $\mu_w$ = viscosity of brine, cp
 $\mu_p$ = viscosity of polymer solution, cp The resistance factor can be determined by measuring the flow rate of brine and the polymer solution through a porous member and calculating the resistance factor as the ratio of the measured flow rates at equal pressure drop.

The selected polymer is dissolved in low salt-content water, and preferably in water that is substantially free of dissolved solids and other agents that adversely effect the properties of the resulting aqueous polymer solution. Thus, it is preferred that the polymer be dissolved in a substantially pure water, or one that has been rendered substantially pure by suitable treatment, and that does not have any added adultrant or deleterious material.

By "low-salt content water" it is meant a water containing less than about 50 ppm dissolved salts, and preferably less than about 25 ppm dissolved salts, and even more preferably less than about 10 ppm dissolved salts. Some naturally occurring waters exhibit these low salt contents, but for the most part higher salt-content, water available at the injection site must be treated to reduce its salt content to acceptable levels. A suitable low salt-content water can be prepared by distillation of a higher salt-content water; by deionizing a higher salt-content water by contact with a cation exchange resin in the hydrogen form and with an anion exchange resin in the hydroxyl form, either in separate contacting steps or in a single step treatment wherein the salt-containing water is contacted with a mixture of anion- and cation-exchange resin; or by other water treating techniques wherein dissolved salts are removed from the water in the amount necessary to produce the desired low-salt content water.

The miscible flooding agent is a small slug, typically from about 0.01 to 0.15 reservoir pore volume, or an alcohol, such as isopropyl alcohol, or other organic solvent; LPG or other light hydrocarbon; liquefied carbon dioxide and sulfur dioxide; soluble oil; or a microemulsion formed by the addition of water to a soluble oil. Preferably, the miscible flooding agent is miscible with the reservoir oil and with the subsequently injected drive water. Of the various miscible flooding agents that can be employed in the practice of this invention, substantially anhydrous soluble oils, i.e., soluble oils having a water content of less than about 10 volume percent, and microemulsions formed by the addition of water to a soluble oil are especially preferred.

The soluble oils used herein are oleaginous compositions which have the ability to spontaneously emulsify with water when admixed therewith. By "spontaneously emulsify" it is meant that an emulsion is formed by simply admixing the soluble oil and water with a minimum of agitation, and particularly without the severe mechanical shearing often required to form emulsions. These soluble oils comprise a liquid hydrocarbon, one or more selected surface active agents, and a minor proportion of a stabilizing agent. The emulsions formed by the addition of water to a soluble oil are of the water-in-oil type in that at water concentrations less than the inversion concentration, oil is the continuous phase and water is dispersed in the oil in the form of very fine droplets, or micelles, which are less than about 0.1 micron in size, and usually range in size from about 100 to 600 A. These emulsions are generally transparent in appearance, and are stable in that they remain as microemulsions on aging. By "transparent," it is meant that the microemulsions do not have a cloudy or opaque appearance when a thin film of the emulsion is viewed on a glass surface, even though the film may contain color bodies. It is recognized, of course, that some cloudiness may appear at certain water concentrations without adversely affecting the utility of the emulsions as miscible displacement agents. Emulsions of this type are designated microemulsions to distinguish them from ordinary water-in-oil macroemulsions in which the lower limit of particle size of the water droplets is greater than about 0.1 micron. At water concentrations above the inversion concentration, the emulsion inverts to an emulsion of the oil-in-water type wherein droplets of oil are dispersed in a continuous water phase. It is preferred that the water concentrations of the microemulsions are maintained below the inversion concentration so as to prevent inversion to emulsions of the oil-in-water type.

One of the major constituents of the soluble oil compositions useful in the practice of this invention is a liquid hydrocarbon, which can comprise crude petroleum oil, such as crude oil previously recovered from the reservoir, or other conveniently available crude oil; a refined or semi-refined petroleum product, such as gasoline, naphtha, stove oil and diesel; or a residual product obtained by the distillation of lower boiling fractions from a crude oil, such as bunker fuel oil and other residual products; a low value refinery byproduct, such as catalytic cycle oil, lube oil extract, and the like; and liquefied normally gaseous hydrocarbons such as propane, butane and LPG. While soluble oils can be prepared from any of these hydrocarbons, or mixtures of different hydrocarbons, in many miscible flooding operations it is preferred to use a soluble oil compounded with petroleum crude oil, such as crude oil previously recovered from the reservoir, or with other conveniently available crude oil.

Surface active materials that can be used in these soluble oil compositions are those that on admixture with the hydrocarbon cause the formation of microemulsions of the water-in-oil type on the subsequent addition of water. Agents which exhibit this property can be defined by their hydrophilic-lipophilic balance and by their spreading coefficients. The hydrophilic-lipophilic balance is an indication of the size and strength of the hydrophilic, or water-loving, or polar groups, and the lipophilic, or oil-loving, or non-polar groups in a surfactant material expressed by a numerical value designated HLB number. The spreading coefficient is an indication of the facility with which one liquid spreads upon another liquid. Spreading coefficients greater than 0 indicate that the first liquid will spread on the second, and coefficients less than 0 indicate that the supernatant liquid will simply form floating lenslike drops. Accordingly, surface active materials, or mixtures of materials possessing the ability to spontaneously emulsify water in oil exhibit average HLB numbers of about 3 to 7, and the most negative spreading coefficient consistent with the system.

A number of surface active materials that exhibit the ability to spontaneously emulsify oil and water to produce water-in-oil microemulsions are commercially available. Among the preferred agents are various preferentially oil-soluble anionic surfactants such as the higher alkyl aryl sulfonates, and particularly the alkyl naphathenic monosulfonates. A particularly preferred surface active agent is an alkyl aryl monosulfonate prepared by sulfonation of an aromatic petroleum fraction. These sulfonates are preferably in the form of their sodium salts, however, other salts can be used. Also, superior soluble oils can be prepared by employing as the surface active agent a combination of preferentially oil-soluble organic sulfonates and preferentially water-soluble organic sulfonates in the proportion of about 1 to about 12 parts by weight of preferentially oil-soluble sulfonate per part of preferentially water-soluble sulfonate.

The various stabilizing agents that are admixed with the soluble oil to improve the properties and stability of the resulting microemulsions formed by admixing the soluble oil and water include partially oxygenated organic liquids such as monohydric and polyhydric alcohols, ketones, ethers, polyhydric alkyl ethers, and organic acids, such as acetic acid, propionic acid and acrylic acid. Specific agents that are particularly useful include isopropyl alcohol, secondary butyl alcohol, methyl ethyl ketone, glycol monoethyl ether (Cellosolve), glycol monobutyl ether, (butyl Cellosolve) and diethylene glycol monobutyl ether (butyl Carbitol). The terms Cellosolve and Carbitol are trademarks of the Union Carbide Co.

A preferred miscible flooding agent for use in the practice of this invention comprises a mixture of about 45 to 90 percent liquid hydrocarbon, such as crude petroleum or other high boiling hydrocarbon; 4 to 30 percent of a surface active material, such as an alkyl aryl sulfonate; 1 to 8 percent stabilizing agent, and 0 to 50 percent water. A particularly preferred miscible flooding agent is a substantially anhydrous soluble oil comprised of a mixture of about 45 to 90 percent liquid hydrocarbon, 4 to 30 volume percent surface active material, 1 to 8 volume stabilizing agent, and less than about 10 volume percent water. Also, where the hydrocarbon liquid has a relatively high viscosity, light liquid hydrocarbon can be added to increase the mobility of the resulting soluble oil to obtain a more favorable mobility ratio between the soluble oil and the following drive fluid.

The compositions useful in the practice of this invention can be prepared by any of the conventional techniques. One suitable method of preparing these compositions is to first admix the hydrocarbon base stock, surface active material and stabilizing agent in the desired proportions to form a substantially anhydrous soluble oil. Thereafter, if desired, water is added to obtain a microemulsion of the desired water content. Preferably, the water employed in forming the microemulsion is a salt-containing fresh water having a dissolved salt content of less than about 15,000 ppm, and preferably of less than 5,000 ppm.

In the practice of the invention, the miscible displacement agent is injected into the reservoir through one or more injection wells in an amount equivalent to about 0.01 to 0.15 reservoir pore volume, and aqueous flooding medium is then injected to displace the miscible solvent toward at least one production well spaced apart in the reservoir, from which fluids are produced in conventional manner. The aqueous flooding medium can comprise water or brine, and can be made more viscous by the addition of a thickening agent, such as sugar, dextran, carboxymethyl cellulose, hydroxyethyl cellulose, amines, glycerine, guar gum, and mixtures of these agents. Also, the aqueous flooding medium can be rendered more viscous by the addition of a small amount of a water-soluble polymer which can be a polymer herein disclosed as useful in mobility control ahead of the miscible solvent. Thus, the same polymer can be employed for mobility control both ahead of and behind the miscible slug, or a different agent can be employed to thicken the aqueous drive fluid.

In a preferred mode of practicing the invention, there is successively injected into a reservoir through one or more injection wells (1) about 0.005 to 0.15 reservoir pore volume of an aqueous polymer solution containing between about 0.01 to 0.20 weight percent of a water-soluble polymer dissolved in a low salt-content water, and preferably about 0.01 and 0.15 weight percent of a water-soluble polymer having the ability to reduce the mobility of water in porous media; (2) about 0.01 to 0.15 reservoir pore volume of a soluble oil or water-in-oil microemulsion formed by the addition of water to a soluble oil; (3) about 0.10 to 0.50 reservoir pore volume of a thickened aqueous flooding medium; and (4) flood water. Alternatively, small slugs of a soluble oil and fresh water can be alternately injected after the initial polymer solution, and these slugs followed by thickened aqueous flooding medium and finally by floodwater. Oil and other produced fluids are recovered from at least one production well spaced apart in the reservoir from the injection wells.

The improved miscible displacement-water drive process of this invention can be employed in a secondary recovery operation, i.e., after primary recovery but prior to conducting a water flood, or in a tertiary recovery operation in which the miscible flooding process is initiated after the completion of a convention water-flood.

The invention is further described by the following examples which are illustrative of specific modes of practicing the invention and are not intended as limiting the scope of the invention as defined by the appended claims.

EXAMPLE 1

The improved oil recovery obtained by the process of this invention is demonstrated by a series of tests on a laboratory model simulating ¼ of a five-spot pattern. The model consists of a 10 cm by 10 cm square by 1 cm thick Nevada 130 sand pack in a Lucite container. A fluid inlet and an outlet are located in diagonally opposed corners. The average permeability of the sand pack is about 5000 md except for a 25,000 md streak of Del Monte 30 sand 1.7 × 1 × 14 cm directly connecting the fluid inlet and outlet.

The model is first saturated with 3 percent sodium chloride solution, and then with a 39° API Illinois crude oil having a viscosity of 7 cp at 75° F. Oil recovery by a conventional water flood is demonstrated by injecting flood water into the inlet and recovering fluids from the outlet. The recovered fluids are collected and their volumes measured.

Next, the model is repacked with sand and resaturated with brine and then with crude oil. A soluble oil flood is conducted by sequentially injecting 0.05 pore volume of soluble oil and 0.20 pore volume of an aqueous flooding medium thickened by the addition of 0.1 weight percent of a partially hydrolyzed polyacrylamide marketed by the Dow Chemical Company under the trademark Pusher 500, followed by flood water. The soluble oil is an admixture of 69.2 volume percent Illinois crude oil, 6.4 volume percent butyl Cellosolve, 20.4 volume percent mixed alkyl aryl sulfonates, and 4.0 volume percent water. The effluent fluids are collected and their volumes measured.

Again, the model is repacked with sand and resaturated with brine and then with crude oil. A flooding operation is conducted in accordance with the method of this invention by sequentially injecting 0.12 pore volume of an aqueous 0.2 weight percent solution of Pusher 500 polymer dissolved in substantially salt-free distilled water, 0.05 pore volume of the soluble oil employed in the previous test, and 0.08 pore volume of a 0.1 weight percent aqueous solution of Pusher 500 polymer, followed by flood water. Pusher 500 polymer exhibits a resistance factor of about 6.7 for a 0.05 weight percent solution of the polymer in a 3 percent by weight aqueous sodium chloride at 25° C. The effluent fluids are collected and their volumes measured. The results of these tests are reported in Table 1.

TABLE 1

| Cumulative Volume of Fluid Injected, pv | Oil Recovery, % Oil-in-Place | | |
|---|---|---|---|
| | Waterflood | Conventional Soluble Oil Flood | Polymer -Pre Injection followed by Soluble Oil Flood |
| 1 | 31.2 | 60.7 | 70.9 |
| 1.5 | 36 | 70 | 79.5 |
| 2 | 40 | 76.5 | 83.5 |
| 3 | 44 | 81.9 | 86.5 |

EXAMPLE 2

The deleterious effect of dissolved salts upon the polymer pre-slug is illustrated by this test. A test is performed substantially in accordance with the method described in Example 1 except that the flood operation is conducted by sequentially injecting 0.12 pore volume of an aqueous 0.2 weight percent solution of Pusher 500 polymer containing 5,000 ppm dissolved sodium chloride, 0.05 pore volume of soluble oil, and 0.08 pore volume of a 0.01 weight percent aqueous solution of Pusher 500 polymer, followed by flood water. The results of this test are reported in Table 2.

TABLE 2

| Cumulative Volume of Fluid Injected, pv | Oil Recovery % Oil-in-Place |
|---|---|
| 1 | 51.1 |
| 1.5 | 61.5 |
| 2 | 68.3 |
| 3 | 76.3 |

It is apparent from a comparison of the results of this test with those obtained in Example 1 that oil recoveries are 10 to 20 percent lower with the salt-containing aqueous polymer pre-slug than with the substantially salt-free aqueous polymer pre-slug.

EXAMPLE 3

An oil recovery operation is conducted in accordance with the method of this invention by sequentially injecting the following fluids into a substantially watered-out petroleum reservoir that has been subjected to a prior water flood:

| Amount, Pore Volume | Fluid |
|---|---|
| 0.03 | Aqueous polymer solution containing 0.04 weight percent of an acrylic acid-acrylamide diacetone acrylamide terpolymer dissolved in de-ionized water containing less than 50 ppm dissolved salt. |
| 0.03 | Soluble oil prepared by admixing 75 volume percent of crude oil, 1.9 volume percent of butyl Cellosolve, 19.1 volume percent of mixed alkyl aryl sulfonates containing 9.4 weight percent active sulfonates, and 4 volume percent water. |
| 0.40 | Aqueous polymer solution containing 0.06 to 0.12 weight percent of acrylic acid-acrylamide-diacetone acrylamide terpolymer. |
| To completion | Flood water. |

A substantial quantity of oil is recovered from a series of spaced production wells.

Various embodiments and modifications of this invention have been described in the foregoing description and examples, and further modifications will be apparent to those skilled in the art. Such modifications are included within the scope of this invention as defined by the following claims.

Having now described the invention, we claim:

1. In the method of recovering oil from a heterogeneous subterranean petroleum reservoir penetrated by at least one injection well and one production well in which a displacement fluid miscible with the reservoir oil is injected through the injection well and into the reservoir, and thereafter an aqueous flooding medium is injected to drive the miscible displacement fluid towards a spaced production well from which fluids are recovered, the improvement which comprises injecting an aqueous solution of water-soluble polymer dissolved in a low salt-content water containing less than 50 ppm dissolved salts into the reservoir through the injection well prior to the injection of said miscible displacement fluid.

2. The method defined in claim 1 wherein said water-soluble polymer is an acrylic acid-acrylamide copolymer, an acrylic acid-acrylamide-diacetone acrylamide terpolymer, a polyacrylamide, a partially hydrolyzed polyacrylamide, hydroxyethyl cellulose, carboxymethyl cellulose, polyoxyethylene, or polysaccharide.

3. The method defined in claim 1 wherein said aqueous solution contains from about 0.01 to 0.2 weight percent of said polymer.

4. The method defined in claim 1 wherein about 0.005 to 0.15 reservoir pore volume of said aqueous solution is injected into the reservoir.

5. The method defined in claim 1 wherein said polymer is an acrylic acid-acrylamide copolymer, partially hydrolyzed polyacrylamide, or acrylic acid-acrylamide-diacetone acrylamide terpolymer characterized by a resistance factor of between about 6 and 25 for a 0.05 weight percent solution thereof in an aqueous 3 percent solution of sodium chloride at 25°C.

6. A method for recovering petroleum from a heterogeneous subterranean petroleum reservoir penetrated by at least one injection well and one production well spaced apart in the reservoir, which comprises:

injecting 0.005 to 0.15 reservoir pore volume of an aqueous solution consisting essentially of a water-soluble polymer and water through said injection well and into said reservoir;

next injecting 0.01 to 0.15 reservoir pore volume of a displacement fluid that is miscible with the reservoir oil;

thereafter injecting an aqueous flooding medium to drive the miscible displacement fluid towards said production well; and recovering oil from said production well.

7. The method defined in claim 6 wherein said water-soluble polymer is an acrylic acid-acrylamide copolymer, an acrylic acid-acrylamide-diacetone acrylamide terpolymer, a polyacrylamide, a partially hydrolyzed polyacrylamide, hydroxyethyl cellulose, carboxymethyl cellulose, polyoxyethylene, or polysaccharide.

8. The method defined in claim 6 wherein said aqueous solution contains from about 0.01 to 0.15 weight percent of said polymer.

9. The method defined in claim 6 wherein said polymer is an acrylic acid-acrylamide copolymer, partially hydrolyzed polyacrylamide, or acrylic acid-acrylamide-diacetone acrylamide terpolymer characterized by a resistance factor of between about 6 and 25 for a 0.05 weight percent solution thereof in an aqueous 3 percent solution of sodium chloride at 25° C.

10. The method defined in claim 6 wherein said water contains less than about 50 ppm dissolved salts.

11. The method defined in claim 6 wherein said displacement fluid is a soluble oil or a water-in-oil microemulsion.

12. The method defined in claim 6 wherein an initial portion of the aqueous flooding medium is increased in viscosity by the addition of a small amount of a water-soluble polymer.

13. A method for recovering oil from a heterogeneous subterranean petroleum reservoir penetrated by at least one injection well and one production well spaced apart in the reservoir, which comprises:

injecting through the injection well and into the reservoir 0.01 to 0.15 reservoir pore volume of an aqueous solution consisting essentially of a substantially salt-free water having dissolved therein 0.01 to 0.15 weight percent of a water-soluble acrylic acid-acrylamide copolymer, a partially hydrolyzed polyacrylamide, or an acrylic acid-acrylamide-diacetone acrylamide terpolymer characterized by a resistance factor of between about 6 and 25 for a 0.05 weight percent solution thereof in an aqueous 3 percent solution of sodium chloride at 25° C.;

next injecting 0.01 to 0.15 reservoir pore volume of soluble oil or water-in-oil microemulsion;

next injecting 0.1 to 0.50 reservoir pore volume of a thickened aqueous flooding medium;

thereafter injecting flood water; and recovering oil from said production well.

14. The method defined in claim 13 wherein said polymer is characterized by a resistance factor of between about 10 to 20 for a 0.05 weight percent solution thereof in an aqueous 3 percent solution of sodium chloride at 25°.

15. The method defined in claim 13 wherein said soluble oil is comprised of a mixture of about 45 to 90 percent liquid hydrocarbon, 4 to 30 percent of a surface active agent, 1 to 8 percent stabilizing agent, and less than about 10 percent water.

* * * * *